United States Patent
Butler (10) Patent No.: US 9,283,535 B2
(45) Date of Patent: Mar. 15, 2016

(54) SYNTHESIS OF OLIGOMERS IN ARRAYS

(71) Applicant: APPLIED BIOSYSTEMS, LLC, Carlsbad, CA (US)

(72) Inventor: John H. Butler, San Jose, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 124 days.

(21) Appl. No.: 13/669,604

(22) Filed: Nov. 6, 2012

(65) Prior Publication Data

US 2013/0165349 A1 Jun. 27, 2013

Related U.S. Application Data

(63) Continuation of application No. 13/277,625, filed on Oct. 20, 2011, now abandoned, which is a continuation of application No. 12/955,798, filed on Nov. 29, 2010, now abandoned, which is a continuation of application No. 12/485,842, filed on Jun. 16, 2009, now abandoned, which is a continuation of application No. 11/172,753, filed on Jun. 30, 2005, now abandoned.

(60) Provisional application No. 60/584,524, filed on Jun. 30, 2004.

(51) Int. Cl.
  *C40B 50/14* (2006.01)
  *C12Q 1/68* (2006.01)
  *B01J 19/00* (2006.01)

(52) U.S. Cl.
  CPC ........ B01J 19/0046 (2013.01); *B01J 2219/005* (2013.01); *B01J 2219/0036* (2013.01); *B01J 2219/0059* (2013.01); *B01J 2219/00286* (2013.01); *B01J 2219/00317* (2013.01); *B01J 2219/00378* (2013.01); *B01J 2219/00414* (2013.01); *B01J 2219/00418* (2013.01); *B01J 2219/00423* (2013.01); *B01J 2219/00454* (2013.01); *B01J 2219/00497* (2013.01); *B01J 2219/00511* (2013.01); *B01J 2219/00585* (2013.01); *B01J 2219/00596* (2013.01); *B01J 2219/00689* (2013.01); *B01J 2219/00722* (2013.01); *B01J 2219/00725* (2013.01)

(58) Field of Classification Search
  CPC ................... B01J 19/0046; B01J 2219/00286; B01J 2219/00317; B01J 2219/0036; B01J 2219/00378; B01J 2219/00414; B01J 2219/00418; B01J 2219/00423; B01J 2219/00454; B01J 2219/00497; B01J 2219/005
  See application file for complete search history.

(56) References Cited

U.S. PATENT DOCUMENTS

| 5,514,789 | A | 5/1996 | Kempe |
| 5,843,767 | A | 12/1998 | Beattie et al. |
| 6,177,558 | B1 | 1/2001 | Brennan et al. |
| 6,309,828 | B1 * | 10/2001 | Schleifer et al. ............. 435/6.11 |
| 6,337,393 | B1 | 1/2002 | Brennan et al. |
| 6,589,726 | B1 * | 7/2003 | Butler et al. .................... 506/16 |
| 6,664,044 | B1 | 12/2003 | Sato |
| 6,824,866 | B1 | 11/2004 | Glazer et al. |
| 7,682,565 | B2 * | 3/2010 | Linton et al. ................. 422/68.1 |
| 2003/0035759 | A1 | 2/2003 | Coyne et al. |
| 2010/0160185 | A1 | 6/2010 | Butler |
| 2011/0123411 | A1 | 5/2011 | Butler |

FOREIGN PATENT DOCUMENTS

| WO | WO-02/094846 | 11/2002 |
| WO | WO /02/094846 | * 11/2002 |

OTHER PUBLICATIONS

Butler, John H. et al., "In Situ Synthesis of Oligonucleotide Arrays by Using Surface Tension", *J. Am. Chem. Soc.*, vol. 23, No. 37, 2001, 8887-8894.

* cited by examiner

*Primary Examiner* — Amanda Haney (57) ABSTRACT

Systems, including apparatus and methods, for synthesis of oligomers in arrays.

21 Claims, 4 Drawing Sheets

SYNTHESIS OF OLIGOMERS IN ARRAYS

CROSS-REFERENCE TO RELATED APPLICATION

This application is a continuation of U.S. application Ser. No. 13/277,625 filed Oct. 20, 2011, which is a continuation of U.S. application Ser. No. 12/955,798 filed Nov. 29, 2010, now abandoned, which is a continuation of U.S. application Ser. No. 12/485,842 filed on Jun. 16, 2009, now abandoned, which is a continuation of U.S. application Ser. No. 11/172,753 filed on Jun. 30, 2005, now abandoned, which claims the benefit under 35 U.S.C. §119(e) of U.S. Provisional Application No. 60/584,524, filed Jun. 30, 2004, all of which disclosures are herein incorporated by reference in their entirety.

INTRODUCTION

Oligomers are chemical compounds, such as oligonucleotides or peptides, that include a covalently linked chain of individual subunits. The identity of each individual subunit and the sequence of the individual subunits within the chain generally define the chemical and biological properties of each oligomer. In particular, a small change in the chemical structure of an oligomer, such as a single nucleotide change in an oligonucleotide, can impart quite distinct biological properties to the oligomer. Accordingly, large sets of oligomers can be synthesized for use in various clinical and research applications.

SUMMARY

The present teachings provide systems, including apparatus and methods, for synthesis of oligomers in arrays.

DESCRIPTION OF VARIOUS EMBODIMENTS

The present teachings provide systems, including apparatus and methods, for synthesis of oligomers in arrays. The apparatus can include a synthesis support device that defines an array of addressable sites (and reaction compartments). This array of sites can be defined by a porous member having (1) a plurality of porous islands, and (2) a spacer of different surface energy (e.g., wettability) than the porous islands that separates the porous islands. For example, the islands can be more hydrophilic (or less hydrophobic) than the spacer. Accordingly, the islands can be addressed in isolation with smaller volumes of fluid, such as with selected reagents for oligomer synthesis, because the different surface energy of the spacer can restrict lateral movement of the fluid away from the islands. In addition, the islands can be addressed in fluid communication with one or more common reagents using larger volumes of fluid that can flood the islands and thereby overcome the surface energy barrier created by the spacer. Methods of synthesizing oligomers using porous members also are disclosed.

Oligomers can be synthesized on reaction surfaces that overlap and/or are spaced from the porous islands. For example, the reaction surfaces can be provided by reaction compartments defined by the porous islands and/or in reaction compartments disposed adjacent the porous islands, such as on adjoining channel walls and/or particles, among others. Accordingly, each oligomer can be synthesized on two or more distinct reaction surfaces that can provide separate populations of the oligomer for the same or different purposes, such as structural analysis (e.g., sequence verification and/or quality control) and/or experimental/diagnostic use, among others. Therefore, the systems of the present teachings can offer (1) greater flexibility of solid-phase oligomer synthesis and/or (2) synthesis of a larger amount of each oligomer in a smaller area and/or with a smaller amount of reagents than systems that synthesize oligomers on a nonporous planar surface, in microplate wells, and/or in separate columns.

Figure 1:
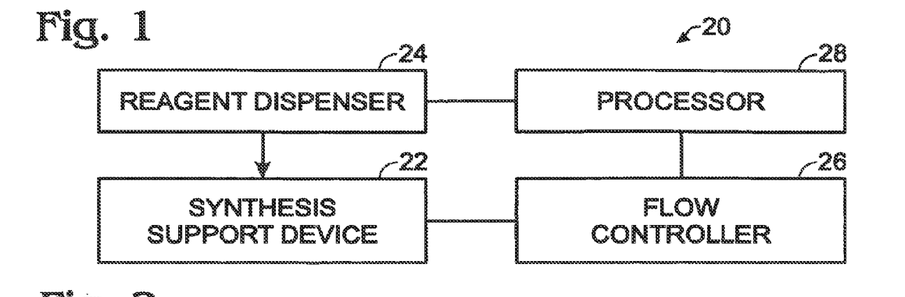
FIG. 1 is a schematic view of an exemplary system for solid-phase synthesis of oligomers in an array using a synthesis support device having a porous member that defines an array of addressable sites, in accordance with aspects of the present teachings.

FIG. 1 shows an exemplary system 20 for synthesizing oligomers in an array. System 20 can include a synthesis support device or platform 22 that defines an array of addressable sites and reaction compartments for solid-phase oligomer synthesis. System 20 also can include a reagent dispenser 24, a flow controller 26, and/or a processor 28, among others.

Reagent dispenser 24 can be configured to dispense reagents selectively to individual sites of device 22 and/or to dispense one or more common reagents nonselectively to many or all of the addressable sites of the support device.

Flow controller 26 can exert a pressure periodically or continuously on the synthesis support device, to move reagents into and/or through reaction compartments. Accordingly, the flow controller can include a pump, a centrifuge, and/or pressurized gas, among others.

Processor 28 can be a data processor or controller configured to control and coordinate any suitable aspects of system 20. For example, processor 28 can control positioning of the reagent dispenser, can select reagents and volumes thereof to be dispensed, and/or can operate valves and/or pumps that effect dispensing of the selected reagents and volumes. Alternatively, or in addition, processor 28 can control operation of flow controller 26, such as selecting the times at which pressure is exerted on the synthesis support device, thereby controlling reaction (or reagent contact) times during oligomer synthesis.

Figure 2:
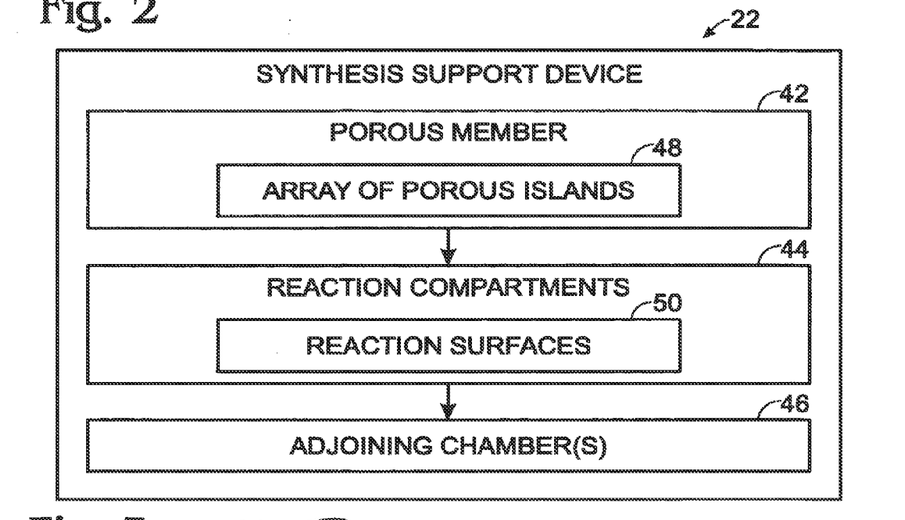
FIG. 2 is a schematic view of the synthesis support device of FIG. 1, in accordance with aspects of the present teachings.

FIG. 2 shows a schematic representation of synthesis support device 22. Support device 22 can include a porous member 42, reaction compartments 44, and/or an adjoining chamber(s) or receiver compartment(s) 46, among others. Porous member 42 can define an array of addressable regions or sites, generally as an array of porous islands 48 separated by a spacer of different surface energy than the islands. Reagents can be received in each of the porous islands for placement in reaction compartments 44 having reaction surfaces 50 for supporting solid-phase oligomer synthesis. Alternatively, or in addition, the reaction compartments can be used to conduct liquid-phase oligomer synthesis, during which oligomer intermediates are not coupled to a solid support surface.

Reaction compartments 44 and/or reaction surfaces 50 can be disposed in one-to-one correspondence with the porous islands. Accordingly, the reaction compartments and reaction surfaces can define arrays aligned with, adjacent, and/or overlapping the array of porous islands 48 included in the porous member. For example, reaction surfaces 50 can be in reaction compartments included in the porous islands and/or disposed adjacent the porous islands. In some examples, at least a portion of each reaction surface can be included in a reaction compartment configured as a channel (a permeable well) adjoining each porous island. The channel can have a reaction surface defined by a wall of the channel and/or by a support matrix, such as particles, disposed in the channel, among others. The channel can be configured to receive a reagent from a corresponding porous island, to temporarily retain the reagent, and then to permit the reagent to be removed from the channel. The reagent can be removed by fluid flow out of the channel into adjoining chamber 46, which can serve as a waste reservoir. Fluid flow can be created by a pressure created by a flow controller in fluid communication with the adjoining chamber.

Further aspects of the present teachings are described in the following sections, including (I) synthesis support devices, (II) reagent dispensers and reagents, (III) reagent removal mechanisms, and (IV) examples.

I. SYNTHESIS SUPPORT DEVICES

The synthesis systems of the present teachings can include one or more synthesis support devices. A synthesis support device generally includes any device having an array of reaction surfaces that are individually addressable with selected reagents and capable of supporting oligomers during their synthesis. Support devices can include an array portion with a porous member and reaction compartments. The support device also can include a body portion or frame holding the array portion and at least partially defining an adjoining chamber(s). Further aspects of support devices are included in the following subsections, including (A) porous members, (B) reaction compartments, and (C) adjoining chambers.

A. Porous Members

A porous member, also termed a filtration device, generally includes any structure having a plurality of pores permitting passage of fluid between opposing surfaces of the structure.

The porous member can have any suitable configuration and can be formed of any suitable material(s). The porous member can be one-piece (unitary), or it can be formed of or two or more distinct pieces. In some examples, the porous member can be generally planar, with its thickness substantially less than its length and width. The thickness of the porous member can be selected, for example, according to a desired mechanical strength, ease of fabrication, a desired fluid capacity per unit area (according to pore size/density), and/or the like. In some examples, the porous member can be nonplanar. The porous member can have any suitable size and can be large enough to define an array of any suitable size. The porous member can be formed of a material that is a conductor (including a metal or a semi-conductor, among others) or an insulator. Exemplary materials that can substantially form the porous member can include silicon, gallium, a metal(s), a metal alloy(s), plastic, ceramic, glass, and/or any combination thereof, among others.

The porous member can include a plurality of porous islands or porous regions separated by a spacer. Each porous island or region can be configured to permit fluid communication between opposing surfaces of the island. Accordingly, the porous island includes at least one pore (or opening), and generally a plurality of pores (or openings), configured to permit such fluid communication. The porous island can have any suitable shape, including rectangular, circular, ovalloid, elliptical, etc.

Porous islands can be present in any suitable number and in any suitable arrangement. The porous islands can have a regular or irregular spacing. In exemplary embodiments, the porous islands are disposed in a rectilinear arrangement of two or more rows and two or more columns. However, other suitable arrangements can include one row or one column and can include a radial array, a staggered (e.g., hexagonal) array, an irregular array, and/or the like. In exemplary embodiments, the porous islands (and associated reaction compartments) can define an array of about 100 to 5,000 islands. In some examples, the array can correspond in spacing and arrangement to a microplate array, for example, a microplate with 96, 384, or 1536 wells, among others. In such examples, the center-to-center spacing between islands can be about 9 mm, 4.5 mm, or 2.25 mm, among others, and the arrangement of islands can be an 8×12, 16×24, or 32×48 rectangular array, among others.

The spacer can be any intervening material that at least substantially or completely separates the porous islands. The spacer can be joined to the porous islands, for example, formed with the porous islands from a single piece of material. Accordingly, the spacer can be porous and can have pores that are similar (or different) in size and/or shape to those of the porous islands.

The porous islands and the spacer can have different surface energies to provide differential wettabilities or surface tensions. These differences can be local and/or average differences, among others. Different surface energies, as used herein, can be a differential affinity for fluid sufficient or effective to restrict lateral movement or spreading of a liquid from an island to the spacer (and thus from an island to an adjacent island). For example, the porous islands can have a higher surface energy than the spacer, so that the porous islands are relatively hydrophilic and the spacer is relatively hydrophobic. A polar liquid (such as water or an aqueous solution) thus can be selectively addressed to one (or more) of a plurality of hydrophilic islands separated by a hydrophobic spacer. This setup is particularly suitable for synthesis of water-soluble oligomers or polymers, such as nucleic acids and proteins. Conversely, the porous islands can have a lower surface energy than the spacer, so that the porous islands are relatively hydrophobic and the spacer is relatively hydrophilic. A nonpolar liquid (such as an organic solvent) thus can be selectively addressed to one (or more) of a plurality of hydrophobic islands separated by a hydrophilic spacer. This setup is particularly suitable for synthesis of water-insoluble oligomers or polymers. Generally, relatively higher wettabilities imply a greater tendency for a fluid to spread on a solid surface and be imbibed by a porous surface, and relatively lower wettabilities imply a lesser tendency for a fluid to spread on a solid surface and be imbibed by a porous surface. The surface energy can be a surface energy of an exterior surface of regions of the porous member and/or of an interior surface defined by pores. Differences in surface energy between the islands and the spacer can be created by differential surface modification/treatment of the islands or the spacer and/or by forming the islands and spacer out of different materials having different surface energies, among others. For example, one of the islands and spacer can be treated with a wetting agent, and/or the other of the islands and spacer can be treated with a nonwetting or waterproofing agent, among others.

The relative affinity between a liquid and a solid surface can be characterized by the contact angle between the liquid in contact with the solid surface. This angle is determined by competition between liquid-liquid molecular forces and liquid-solid molecular forces, and so depends in part on the particular solid and liquid involved, as well as the smoothness and cleanliness of the surface. Generally, the smaller the contact angle, the greater the affinity between the liquid and the surface, and the more easily the liquid will penetrate pores formed by the surface. In particular, in pores penetrated by capillary action, the fluid will rise (or extend) nearer the walls of the pore for contact angles less than 90 degrees (with 0 degrees being totally flat or spread), and the fluid will fall (or recede) nearer the walls for angles greater than 90 degrees (with 180 degrees between totally rounded up or spherical). However, the total penetration of liquid into the pore will be determined by an interplay between contact angle, surface tension, and fluid density, among others. Thus, for a given liquid, the islands and the spacer can be distinguished by different contact angles, typically less than 90 degrees for one, and greater than 90 degrees for the other.

Pores, as used herein, are openings of any suitable diameter and shape. The pores can be macropores or nanopores. Macropores, as used herein, have an average diameter of equal to or greater than about one micrometer, and nanopores have an average diameter of less than about one micrometer. Generally, capillary action will draw fluid more easily into small pores, and less easily into large pores, all other things being equal. The pores can be an interconnected set or network of pores or can follow separate paths between opposing surfaces of the porous member. The pores can be present at any suitable density to achieve any suitable permeability and fluid capacity of a porous member.

Pores can be created by any suitable process. The pores can be created mechanically (e.g., using a drill), optically (e.g., using a laser), chemically (e.g., by wet-etching), electrically (e.g., by using a nonporous member as an electrode), and/or as voids within an assembly of fibers (such as a fiber filter), among others. In exemplary embodiments, the pores are formed by wet-etching a silicon wafer.

B. Reaction Compartments

The synthesis support device can include a plurality of reaction compartments in fluid communication with, overlapping with, and/or at least substantially coextensive with the porous islands. A reaction compartment can include any space for receiving reagents and having a reaction surface(s) to support synthesis of an oligomer(s) using the reagents.

The reaction compartment can be configured to hold fluid transiently and to permit removal of the fluid. Accordingly, the reaction compartment can be defined by and/or disposed adjacent a porous or permeable structure. For example, the reaction compartment can be defined by a porous island of a porous member, with the walls of the pores being reaction surfaces of the compartment. Alternatively, or in addition, the reaction compartment can be or include a space disposed adjacent the porous island.

The space adjacent the porous island can be a channel that permits fluid flowthrough. The channel can be configured to receive reagents at a first end of the channel and to release at least a portion of these reagents for removal at a second end of the channel. The first and second ends can be generally opposing. Accordingly, the first and second ends of the channel can be permeable, provided, for example, by (1) a porous member (such as a porous island thereof) and (2) a permeable layer flanking the channel. Although the permeable layer can permit fluid flow, the permeable layer can be configured to reduce fluid flow so that reagents are retained at least transiently in the channel to permit chemical reactions to occur.

The channel can include or contain any suitable reaction surfaces to support oligomer synthesis. For example, the channel can have a wall defining a reaction surface. Alternatively, or in addition, the channel can hold a matrix or discrete particles (such as beads) having reaction surfaces. The particles can have any suitable size or shape and can be formed of any suitable material, including plastic (such as polystyrene, among others), glass (such as controlled-pore glass (CPG)), metal, etc.

The space adjacent the porous island, in some embodiments, can be created by a well having a nonpermeable end/bottom wall. In these embodiments, the reagents can be received and removed from the same region of the well.

The reaction surface can be any solid and/or persistent surface (including a gel) to which oligomer intermediates are connected during oligomer synthesis. The reaction surface can provide a covalent linkage to oligomer intermediates (and oligomers). Accordingly, the reaction surface can include a first reactive moiety configured to react to form a covalent bond with a second reactive moiety of an oligomer subunit or intermediate (or a precursor thereof). Exemplary pairs of first and second (or second and first) reactive moieties can be classified as electrophilic and nucleophilic moieties, as presented in Table 1. Here, persistent means that the surface remains at least substantially intact or functional during the course of a surface-associated reaction.

TABLE 1

| Chemically Reactive Moieties | | |
| --- | --- | --- |
| Electrophilic Moiety | Nucleophilic Moiety | Resultant Covalent Linkage |
| activated esters | amines/anilines | carboxamides |
| acyl azides | amines/anilines | carboxamides |
| acyl halides | amines/anilines | carboxamides |
| acyl halides | alcohols/phenols | esters |
| acyl nitriles | alcohols/phenols | esters |
| acyl nitriles | amines/anilines | carboxamides |
| aldehydes | amines/anilines | imines |

TABLE 1-continued

Chemically Reactive Moieties

| Electrophilic Moiety | Nucleophilic Moiety | Resultant Covalent Linkage |
|---|---|---|
| aldehydes or ketones | hydrazides | hydrazones |
| aldehydes or ketones | hydroxylamines | oximes |
| aldehydes or ketones | thiosemicarbazides | thiosemicarbazones |
| alkyl halides | amines/anilines | alkyl amines |
| alkyl halides | carboxylic acids | esters |
| alkyl halides | thiols | thioethers |
| alkyl halides | alcohols/phenols | ethers |
| alkyl sulfonates | thiols | thioethers |
| alkyl sulfonates | carboxylic acids | esters |
| alkyl sulfonates | alcohols/phenols | ethers |
| anhydrides | alcohols/phenols | esters |
| anhydrides | amines/anilines | carboxamides |
| aryl halides | thiol | thiophenols |
| aryl halides | amines | aryl amines |
| azindines | thiols | thioethers |
| boronates | glycols | boronate esters |
| carboxylic acids | amines/anilines | carboxamides |
| carboxylic acids | alcohols | esters |
| carboxylic acids | hydrazines | hydrazides |
| carbodiimides | carboxylic acids | N-acylureas or anhydrides |
| diazoalkanes | carboxylic acids | esters |
| epoxides | thiols | thioethers |
| haloacetamides | thiols | thioethers |
| halotriazines | amines/anilines | ammotriazines |
| halotriazines | alcohols/phenols | triazinyl ethers |
| imido esters | amines/anilines | amidines |
| isocyanates | amines/anilines | ureas |
| isocyanates | alcohols/phenols | urethanes |
| isothiocyanates | amines/anilines | thioureas |
| maleimides | thiols | thioethers |
| phosphoramidites | alcohols | phosphite esters |
| silyl halides | alcohols | silyl ethers |
| sulfonate esters | amines/anilines | alkyl amines |
| sulfonate esters | thiols | thioethers |
| sulfonate esters | carboxylic acids | esters |
| sulfonate esters | alcohols | ethers |
| sulfonyl halides | amines/anilines | sulfonamides |
| sulfonyl halides | phenols/alcohols | sulfonate esters |

Alternatively, or in addition, the reaction surface can provide a noncovalent association with oligomer intermediates (and completed oligomers), such as binding through a specific binding pair (antibody-antigen, receptor-ligand, enzyme-substrate, complementary nucleotide strands, etc.). The reaction surface for noncovalent or covalent association can be any suitable external or internal surface(s) of the synthesis support device including the walls of a channel, the walls of pores, the walls of a well, and/or the exterior/interior surface of particles, among others.

A reaction compartment can include two or more distinct reaction surfaces permitting coupled oligomers to be separated during and/or after their synthesis. The distinct reaction surfaces can be physically separable, that is, disposed on separable structures. Alternatively, or in addition, the distinct reaction surfaces can be chemically distinct so that oligomers can be selectively removed from one or more of the reaction surfaces. Accordingly, distinct reaction surfaces of a reaction compartment can provide oligomer coupling that is selectively sensitive to any suitable uncoupling treatment, such as pH, heat, light, exposure to a particular chemical cleavage agent, etc.

C. Adjoining Chambers

A synthesis support device can have one or more chambers adjoining the array portion of the support device. An adjoining chamber can be substantially enclosed so that the chamber can hold a reduced (or increased) pressure to draw (push) fluid from the reaction compartments to (away from) the chamber. The adjoining chamber can be a single chamber in fluid communication with an entire array of islands/reaction compartments, for concurrent application of an increased or decreased pressure to the islands/reaction compartments. Alternatively, the adjoining chamber can be a plurality of chambers, in fluid communication with individual islands/reaction compartments or subsets of two or more islands/reaction compartments. Configuration of the adjoining chamber as a plurality of chambers can permit selective removal of fluid from a subset of the reaction compartments. In some examples, the synthesis support device can include at least one adjoining chamber configured to receive reagents from the reaction compartments, thereby serving as a waste reservoir.

The adjoining chamber can be created by a chamber structure adjoining the array portion (e.g., the porous member) of the support device. The chamber structure can form a substantial seal against a surface of the array portion, for example, against an upper surface, a lower surface, and/or a perimeter of the array portion. The chamber structure can be disposed generally above and/or below the array portion of the synthesis support device, for example, as a cover for the array portion and/or as a frame that supports the array portion.

II. REAGENT DISPENSERS AND REAGENTS

The synthesis systems of the present teachings can include one or more reagent dispensers configured to dispense reagents to a synthesis support device. A reagent dispenser can include a dispense head, reagent reservoirs, conduits, valves, and/or pumps, among others. The reagent dispenser can dispense reagents using contact and/or noncontact mechanisms.

Each reagent dispenser can dispense reagents to addressable sites of the array portion from one or more dispense heads, each having one or more dispense structures (such as dispense tips, among others). The dispense structures of a dispense head can be fixed and/or movable in relation to the addressable sites. The dispense structures can fixed or movable within a dispense head. In some embodiments, the systems described herein can include two or more dispense heads that are movable independently. Such dispense heads can be configured to dispense the same reagents as each other (redundant dispense heads) or different reagents. If the same or overlapping sets of reagents are dispensed by two or more dispense heads, corresponding dispense structures of the dispense heads can be connected to the same reagent reservoir or different reservoirs. The use of two or more dispense heads (and/or the use of two or more dispense tips per dispense head) can increase synthesis throughput.

Reagent reservoirs disposed in fluid communication with the dispense structures can store any suitable number of reagents. The dispense structures can be connected in one-to-one correspondence with a set of reagent reservoirs. Alternatively, different reagent reservoirs can be in communication with the same dispense structure, to provide, for example, mixed and/or alternate dispensing of reagents from the different reagent reservoirs.

The reagent dispenser can include conduits, valves, and/or a pump to propel, guide, and/or restrict movement of reagents between the reagent reservoirs and the dispense structures. The conduits can define parallel paths between the reagent reservoirs and the dispense structure. Alternatively, or in addition, the conduits can define a branched network so that the same reagent reservoir can connect to a plurality of dispense structures and/or so that a plurality of reagent reservoirs can connect to the same dispense structure. The valves (or one valve) can open and close the conduits and can be operable manually and/or through a controller. The open time for a valve can define the volume of reagent dispensed to a reaction vessel. The pump (or pumps) can be any mechanism that propels reagents from the reagent reservoirs to the dispense structures and/or that expels reagents from the dispense structures. The pump can exert a pressure on reagents directly or on a compartment in fluid communication with the reagents. The pump can act to push and/or pull reagents during dispensing (e.g., by creating positive relative pressure within a dispense tip to push reagents out, or by creating a negative relative pressure outside the dispense tip to pull reagents out, respectively, among others). Accordingly, the pump can be a positive-displacement pump (e.g., a syringe pump, a peristaltic pump, a rotary pump, etc.), a vacuum pump, pressurized gas, a partial vacuum, and/or the like. In some embodiments, the gas (such as argon, among others) provided by the pump places reagents under a more inert environment, such as by reducing exposure to moisture, oxygen, etc. In some embodiments, the dispenser can include nozzles configured to dispense small volumes of some of or all of the reagents, for example, using inkjet technology, such as a piezoelectric dispense mechanism and/or a thermal dispense mechanism, among others.

The reagent dispenser can dispense any suitable reagents for synthesis of oligomers. Such reagents, generally termed oligomer reagents, can include oligomer components and ancillary reagents.

Oligomer components generally include any chemical compounds that are partially or completely incorporated into oligomers during their synthesis, generally through covalent linkage. Oligomer components can be configured so that reactive groups are protected, exposed, and/or created relative to parent compounds, as appropriate. An oligomer component can correspond to a portion or all of a subunit of an oligomer, a dimer of subunits, a trimer of subunits, etc. Exemplary oligomer components include nucleic acid components, such as deoxyribonucleotides, ribonucleotides, peptide nucleic acids, locked nucleic acids, or analogs, relatives, derivatives (e.g., phosphoramidite derivatives thereof, among others), or portions thereof. In some examples, the oligomer components can include adenosine, cytidine, guanosine, and thymidine phosphoramidites held in individual reservoirs, to be addressed individually (or in combination) to reaction compartments. Alternatively, or in addition, the oligomer components can include nucleotide derivatives with modified bases. Other exemplary oligomer components include amino acids, or analogs, relatives, derivatives, or portions thereof, to form peptides or peptide analogs (peptidomimetics). Additional exemplary oligomer components can include carbohydrates, lipids, metalorganic compounds, etc.

Ancillary reagents can include any other reagents that facilitate oligomer synthesis. Such ancillary reagents can include a solvent or fluid carrier, reagents for capping (protection of reactive groups), deprotection, oxidation, reduction, cyclization, washing, cleavage (uncoupling from a reaction surface), etc. In some embodiments, the fluid carrier can be or include acetonitrile. Alternatively, or in addition, the fluid carrier can be or include a high-boiling point liquid (solvent), such as described in U.S. Pat. Nos. 6,177,558 and 6,337,393 to Brennan et al., each of which is incorporated herein by reference. In some embodiments, reagents can be configured to perform a gas/vapor phase cleavage, as described, for example, in U.S. Pat. No. 5,514,789 to Kempe, which is incorporated herein by reference.

Oligomers generally include any molecule formed of two or more covalently linked subunits. The term oligomer, as used herein, also is intended to encompass polymers of any size or complexity. Accordingly, an oligomer can have any suitable number of subunits, for example, greater than ten, greater than one-hundred, or greater than one-thousand subunits, among others. The various subunits of an oligomer can be structurally identical (such as oligomers with a repeated subunit), structurally related but including distinct subunits (such as oligomers of different nucleotides or amino acids), and/or structurally unrelated (such as oligomers including different structural classes of subunits), as desired. Oligomers synthesized by the systems described herein can have a predefined size (or length), composition, and/or sequence of subunits. However, such oligomers can be synthesized as mixtures of oligomers, such as degenerate oligonucleotides synthesized with a mixture of nucleotide components at one or more positions of the oligonucleotides.

The oligomers can be used for any suitable purpose(s). For example, nucleic acids oligomers can be used in genomics applications, such as gene expression analysis, detection of single-nucleotide polymorphisms, and/or high density TAQ-MAN assays, among others. Accordingly, nucleic acid oligomers can be used as probes (e.g., fluorescence in situ hybridization (FISH) probes), primers (e.g., polymerase chain reaction (PCR) primers), substrates, test compounds for screens, and/or reagents, among others. Amino acid polymers similarly can be used as probes, primers, substrates (e.g., enzyme substrates such as kinase substrates), biological modulators, test compounds for screens, and/or reagents, among others.

III. REAGENT REMOVAL MECHANISMS

Reagents, including reacted derivatives thereof, can be removed from reaction compartments using one or more reagent removal mechanisms of an oligomer synthesis system. A reagent removal mechanism can remove excess/unreacted reagent from a reaction compartment to a waste reservoir, such as an adjoining chamber, for example, as described above in Section I. The reagent removal mechanism can be configured to remove reagents from the reaction compartments of the array at substantially the same time or at different times for subsets of the array. Alternatively, or in addition, the reagent removal mechanism can be configured to move reagents within the array portion of a synthesis support device, such as movement from a porous member to an adjoining reaction compartment, among others.

The reagent removal mechanism can be configured to push and/or pull fluid from a reaction compartment. For example, the reagent removal mechanism can exert a positive pressure to push the fluid through the reaction compartment. Alternatively, or in addition, the reagent removal mechanism can exert a negative pressure to pull the fluid from the reaction compartment. The pressure exerted by the reagent removal mechanism can be adjustable and controlled by a processor to define the rate of movement of reagents through a reaction compartment, time of contact with the reagents, etc. In some examples, reagents can be removed by centrifugation of the synthesis support device.

The reagent removal mechanism can be configured to operate on one reaction compartment at a time, on a set of two or more reaction compartments at the same time, or on all of the reaction compartments concurrently. Accordingly, the reagent removal mechanism can be disposed adjacent each of the reaction compartments concurrently or can move among the reaction compartments of a synthesis support device, for example by sliding back and forth and/or movement along two axes, among others, to selectively remove reagent(s) from a subset of the reaction compartments.

IV. EXAMPLES

The following examples describe selected aspects and embodiments of the present teachings, including an exemplary synthesis system for synthesizing oligomers in an array, support devices for oligomer synthesis in arrays, and methods of making and using such support devices. These examples and the various features and aspects thereof are included for illustration and are not intended to define or limit the entire scope of the present teachings.

Example 1

Exemplary System for Oligomer Synthesis in an Array

Figure 3:
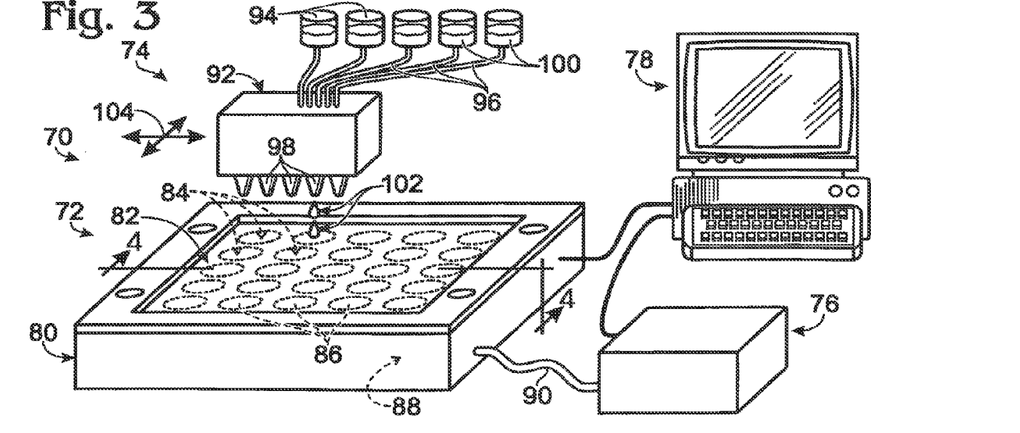
FIG. 3 is a view of another exemplary system for solid-phase synthesis of oligomers in an array using a synthesis support device having a porous member that defines an array of addressable sites, in accordance with aspects of the present teachings.

This example describes an exemplary system for oligomer synthesis in an array; see FIG. 3.

Synthesis system 70 can include an array device 72, a reagent dispenser 74, a flow controller 76, and a computing device 78, among others. Reagent dispenser 74 can dispense reagents to array device 72. Flow controller 76 can be disposed in fluid communication with the array device for continuous or periodic removal of the dispensed reagents (or portions/derivatives thereof) from reaction compartments of the array device. Computing device 78 can be disposed in communication with array device 72, reagent dispenser 74, and/or flow controller 76 for operation and/or monitoring thereof.

Array device 72 can include a chamber structure or frame 80 and an array portion 82 held by the frame. Array portion 82 can define an array 84 of selectively addressable reaction compartments 86. Frame 80 and array portion 82 can cooperatively define a chamber 88 in which fluid is received from the reaction compartments. Frame 80 can be connected to tubing 90 that provides fluid communication between flow controller 76 and chamber 88.

Reagent dispenser 74 can include a dispense head 92, reagents reservoirs 94, and conduits 96 connecting the reagent reservoirs to the dispense head. The dispense head 92 can include one or more dispense tips 98 from which reagents 100 of the reagent reservoirs 94 can be dispensed, shown at 102. Dispense head 92 and/or tips 98 can be movable (such as orthogonally), shown at 104, to position the head or tips for selective delivery to reaction compartments 86. Alternatively, or in addition, array device 72 can be movable to position reaction compartments in relation to dispense head 92 and/or tips 98.

Computing device 78 can control and coordinate operation of system 70. For example, computing device 78 can be configured to select a reagent reservoir(s) from which a reagent will be dispensed, to select a position for head 92, and to operate a pump and/or valve(s) to control the volume of the reagent that is delivered. Computing device 78 can operate flow controller 76 to control exposure of the reaction compartments to reagents. Computing device 78 also or alternatively can be in communication with one or more sensors of the system. The sensors can be configured to sense any suitable aspects of the system, including temperature, reagent status, pressure, dispensed volume, reaction efficiency, etc.

Example 2

Exemplary Synthesis Support Device

Figure 4:
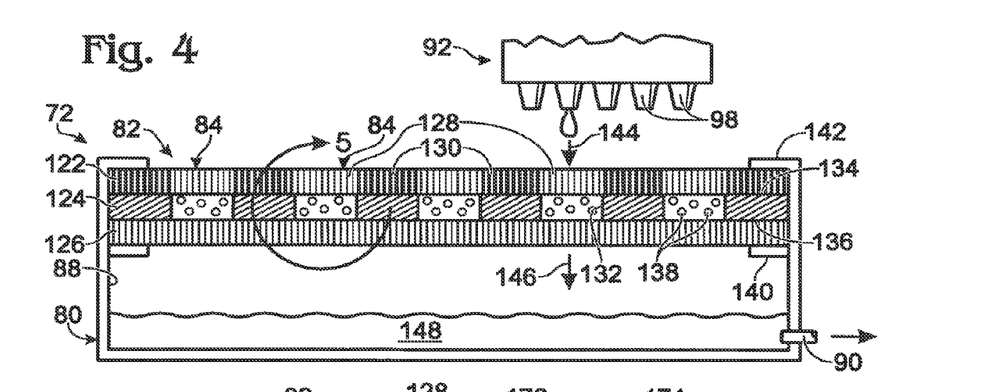
FIG. 4 is a sectional view of the synthesis support device of FIG. 3, taken generally along line 4-4 of FIG. 3, in accordance with aspects of the present teachings.
Figure 5:
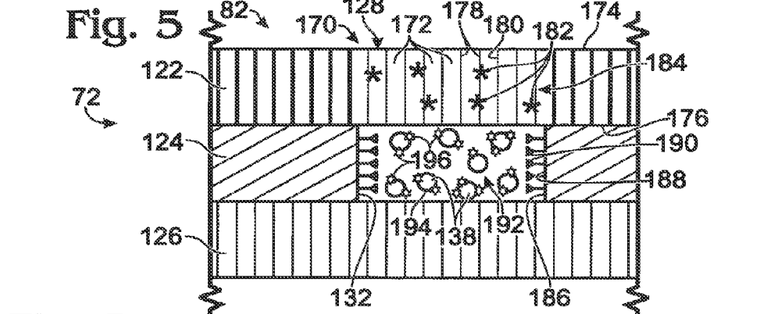
FIG. 5 is fragmentary sectional view of an exemplary addressable site (and reaction compartment) from the synthesis device of FIG. 4, taken generally from the region indicated at "5" in FIG. 4.

This example describes an exemplary synthesis support device, and reaction compartments and reaction surfaces thereof; see FIGS. 4 and 5. Selected aspects of this synthesis support device were discussed above in Example 1, particularly in the context of FIG. 3.

Support device 72 can include an array portion 82 formed by one or more apposed layers of material. The apposed layers can include a porous member 122, a channel layer 124, and a permeable retainer layer 126.

Porous member 122 can form a top layer of array portion 82. The porous member can include a plurality of porous islands 128 separated by a spacer 130 to define array 84. The porous islands can have any suitable arrangement to define an array of addressable regions. The porous islands can be substantially more hydrophilic than the spacer, for example, so that the spacer is hydrophobic and the islands hydrophilic.

Channel layer 124 can define an intermediate or lower layer of array portion 82. The channel layer can form an array of channels or through-holes 132 extending between opposing surfaces 134, 136 of the channel layer. Channels 132 can correspond in number and arrangement to the porous islands, so that channels 132 and porous islands 128 are substantially aligned and present in one-to-one correspondence. Each channel 132 can contain one more particles 138.

Retainer layer 126 can define a lower layer of array portion 82. The retainer layer can be configured to retain particles 138 (and fluid) in channels 132. The retainer layer also can be permeable to permit fluid flow through this layer. The retainer layer can be any permeable material, including a fiber filter (e.g., formed of glass fibers, cellulose, synthetic polymer strands, etc.), a layer of porous silicon, or the like.

Array portion 82 can be assembled from two or more layers, such as the sandwich of three layers shown herein, and can be supported by frame 80. Frame 80 can include a support flange 140 to support the array portion above chamber 88. Frame 80 also can include an opposing flange 142 that opposingly grips the array portion with support flange 140. Opposing flange 142 can be adjustable to restrict removal of array portion 82 and/or separation or relative movement of the layers thereof during oligomer synthesis. Opposing flange 142 can be removable to allow processing of the array portion during and/or after oligomer synthesis.

During oligomer synthesis, reagents can be addressed to each porous island from dispense tips 98 of dispense head 92, shown at 144. Reagents can be received by porous islands 128 and can flow to channels 132 for contact with particles 138 therein. After reaction, the reagents (or portions/derivatives thereof) can be moved from channel 132, through retainer layer 126 and into waste reservoir 88, shown at 146, to join waste fluid 148.

FIG. 5 shows an individual reaction compartment 170 of array portion 82 of the synthesis support device 72. Reaction compartment 170 can be formed by porous island 128, channel 132, particles 138, or a combination thereof, among others.

Porous island 128 can include a plurality of pores 172, which are shown schematically in the present illustration. Individual pores or sets of pores 172 can extend between opposing surfaces 174, 176 of porous member 122 to permit passage of fluid through the island. Pores can be defined by pore walls 178 that include pore reaction surfaces 180. Pore reaction surfaces 180 can include a first reactive moiety 182 covalently or noncovalently coupled to the pore walls. Accordingly, pores 172 can be configured to create an island reaction sub-compartment 184.

Channel 132 can be configured to be defined by channel walls 186 having channel reaction surfaces 188. Channel reaction surfaces can include a second reactive moiety 190 coupled to channel walls 186. In the present illustration, second reactive moiety 190 is distinct from first reactive moiety 182 of the porous member. In some examples, the same reactive moiety can be coupled to each of the porous member and the channel layer, and/or a plurality of different reactive moieties can be included in one or more of the surfaces. Channel 132 can form a channel reaction sub-compartment 192 adjoining the island reaction sub-compartment 184.

Channel reaction sub-compartment 192 can contain particles 138 having particle reaction surfaces 194. Particle reaction surfaces 194 can include a third reactive moiety 196, which can be the same or different from the other reactive moieties. In the present illustration, third reactive moiety 196 is different from first and second reactive moieties 182, 190. Use of different reactive moieties can provide support for synthesis of different oligomers within a reaction compartment and/or selective uncoupling of a subset of an oligomer population from a reaction compartment.

Example 3

Placement of Reagents in Reaction Compartments

Figure 6:
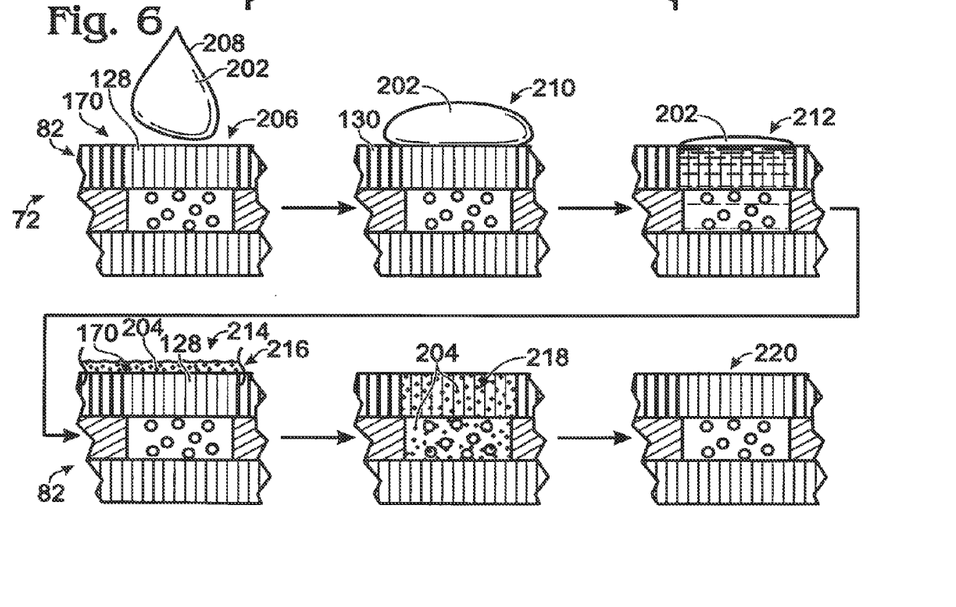
FIG. 6 is a series of fragmentary sectional views of configurations of the addressable site of FIG. 5 as the site is being addressed with a first reagent in fluid isolation from other addressable sites of the synthesis support device, and then with a second reagent in fluid communication with the other addressable sites, in accordance with aspects of the present teachings.

This example describes exemplary methods of addressing reaction compartments in fluid isolation or fluid communication; see FIG. 6. In the present sequence of configurations, first and second reagents 202, 204 are shown being dispensed sequentially to reaction compartment 170 with the first reagent in isolation from, and the second reagent in communication with, other reaction compartments of array portion 82.

First reagent 202 can be dispensed from above (and/or adjacent) porous island 128, shown at 206 in the first configuration. The first reagent can be dispensed in a droplet(s) 208 having a volume insufficient to spread laterally beyond the island after contact with the porous island. Accordingly, the placed droplet, shown at 210 in the second configuration, can be restricted substantially to the porous island and restricted from flowing laterally over or into spacer 130 by a difference in surface energy of the porous island and the surrounding spacer. First reagent 202 thus can be received in reaction compartment 170, in fluid isolation from other reaction compartments, shown at 212 in the third configuration. The first reagent can be received by a force or pressure exerted on the first reagent (such as a vacuum, a positive pressure, or a centrifugal force) and/or by capillary action.

Second reagent 204 can be dispensed to array portion 82 after the first reagent, shown at 214 after placement, in the fourth configuration of the sequence. First reagent 202 can be substantially removed from reaction compartment 170 before dispensing second reagent 204, as shown in the present illustration, or second reagent 204 can be dispensed to porous island 128 before substantial removal of first reagent 202 from the reaction compartment. The second reagent can be dispensed in a fluid volume sufficient to spread laterally beyond the island, to "flood" the upper surface of the porous member, indicated at 216 in the fourth configuration. As a result, second reagent 204 can be introduced into concurrent contact with a plurality of the porous islands (and/or all of the porous islands) with a single dispensing operation. Furthermore, the second reagent can be received substantially concurrently in each of the reaction compartments of the array portion 82 from above the porous islands, shown for one of the reaction compartments at 218 in the fifth configuration. The second reagent can be removed after being received in the reaction compartment, shown at 220 in the sixth configuration.

Example 4

Oligomer Release

Figure 7:
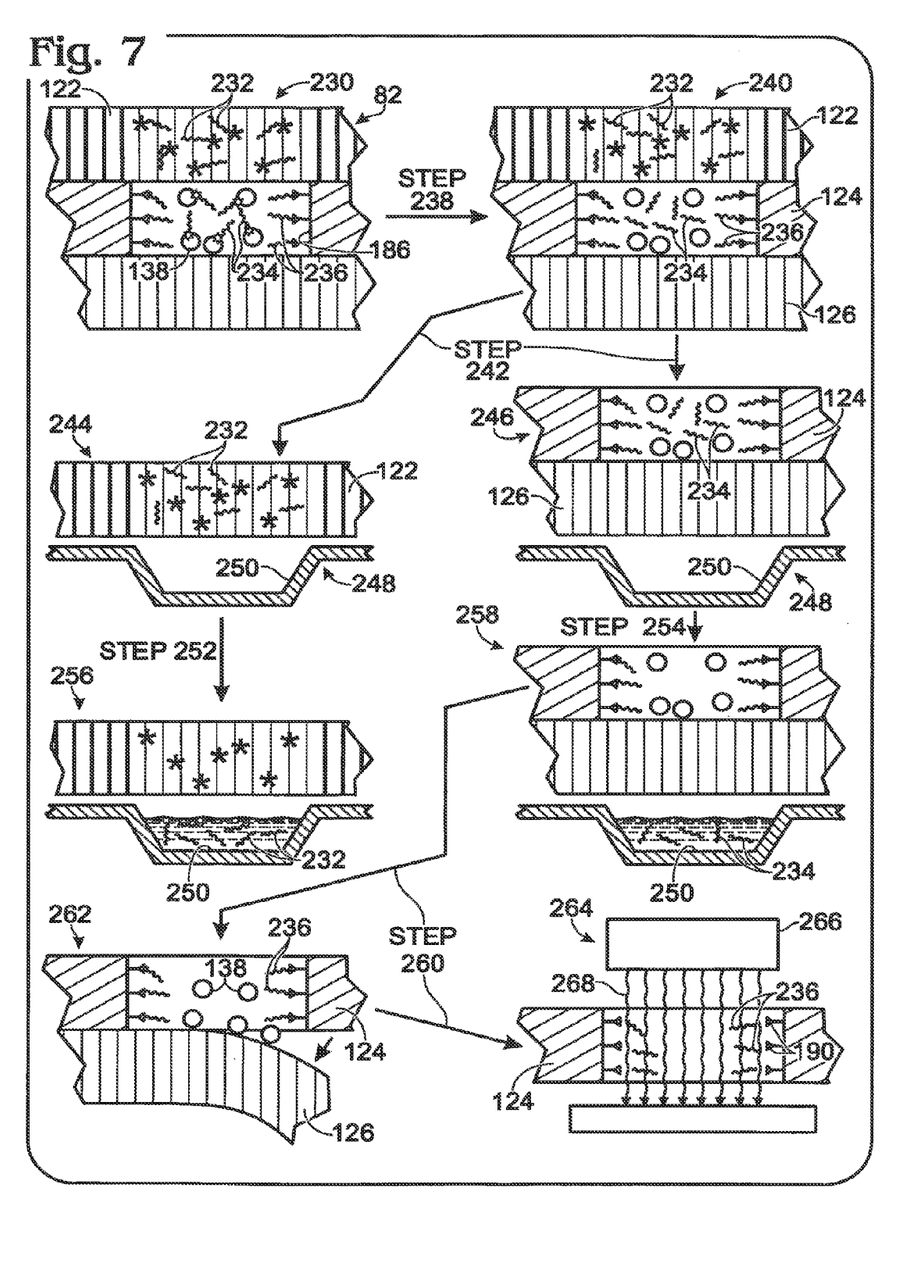
FIG. 7 is a series of fragmentary sectional views of configurations of the addressable site of FIG. 5 during post-synthesis processing of oligomer populations synthesized on solid support surfaces of the site, in accordance with aspects of the present teachings.

This example describes exemplary methods of releasing oligomers from various reaction surfaces of a support device; see FIG. 7.

Configuration 230 of the sequence shows completed oligomer populations 232, 234, 236 connected, respectively, to support surfaces of porous member 122, particles 138, and channel wall 186 of array portion 82. These oligomer populations can represent structurally identical or distinct oligomer populations. A subset of the oligomer populations, such as oligomer populations 232 and 234, can be selectively uncoupled (cleaved) from their support surfaces by a cleavage treatment, indicated at step 238. In the present illustration, step 238 includes a vapor phase cleavage/deprotection, without elution of the uncoupled oligomer populations. Accordingly, prior to cleavage, a subset of the oligomer populations, such as oligomer populations 232, 234, can be coupled to their support surfaces using a different association mechanism than the remaining oligomer population(s), such as oligomer population 236. Configuration 240 shows oligomer populations 232, 234 uncoupled from their support surfaces but not removed from regions adjacent these surfaces.

Porous member 122 can be separated from the channel and retainer layers 124, 126, shown at step 242. The resultant configurations 244, 246 each can be disposed adjacent a sample holder 248, for example, a sample holder having wells 250 or other receiving compartments arranged according to the array of reaction sub-compartments of porous member 122 and channel layer 124.

A force can be applied to each of the porous member and the channel layer, shown respectively at steps 252 and 254. The force can be applied by a vacuum pump, pressurized gas, and/or by centrifugation, among others. The force can elute oligomer populations 232, 234 from their respective support structures into wells 250, shown in configurations 256, 258. In some examples, additional fluid, such as an aqueous buffer, can be added to one or both reaction sub-compartments to facilitate elution of the oligomer populations from the porous member and channel layer. Eluted oligomers can be analyzed according to their concentration, purity, sequence, and/or the like, for example, for quality control purposes. Alternatively, or in addition, eluted oligomers can be used for any suitable assay(s). The eluted oligomers produced by steps 252, 254 can form duplicate or corresponding arrays for the same or different purposes.

Channel layer 124 can be separated from retainer layer 126 and particles 138, shown at step 260 and represented by a partially disassembled state in configuration 262. Particles 138 can be discarded at this stage.

Configuration 264 shows oligomer population 236 being cleaved from its support surface by a laser 266 and subsequently analyzed. Oligomer population 236 can be coupled to channel layer 124 by a linker 190 that is resistant to the vapor phase cleavage treatment of step 238. Accordingly, oligomer population 236 can remain coupled to its support surface during the processing steps preceding step 260. Linker 190 can be a photocleavable linker (e.g., o-nitro benzyl, among others), so that light 268 from laser 266 can be used to cleave the oligomer in a vacuum. The cleaved oligomer thus can be analyzed by travel through an electric field by mass spectrometry, such as by matrix assisted laser desorption ionization (MALDI). Accordingly, channel layer 124 can be formed of a conductive material, such as silicon, among others.

Example 5

Fabrication of Support Devices

Figure 8:
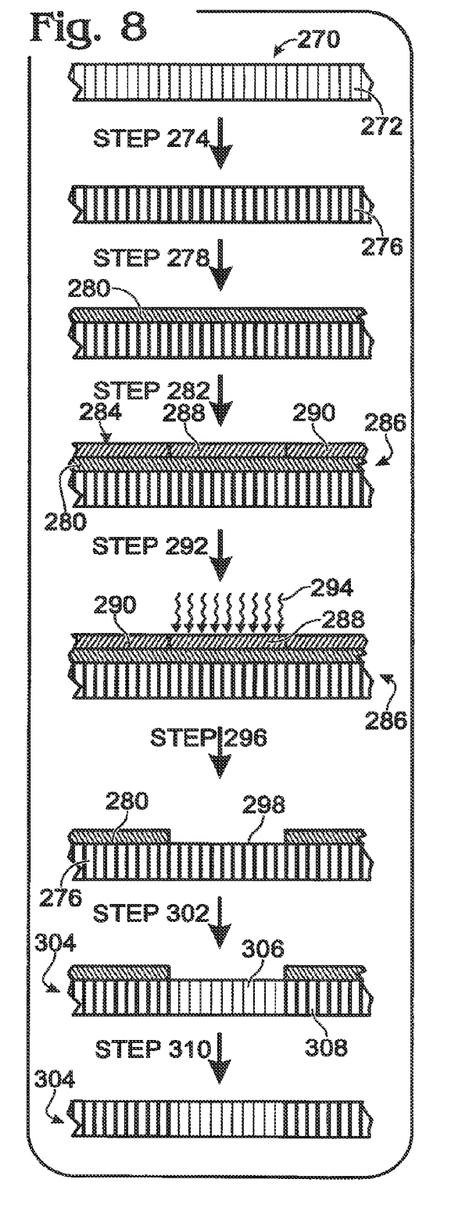
FIG. 8 is a series of views of a porous member being processed so that regions of the porous member are addressable selectively, in accordance with aspects of the present teachings.
Figure 9:
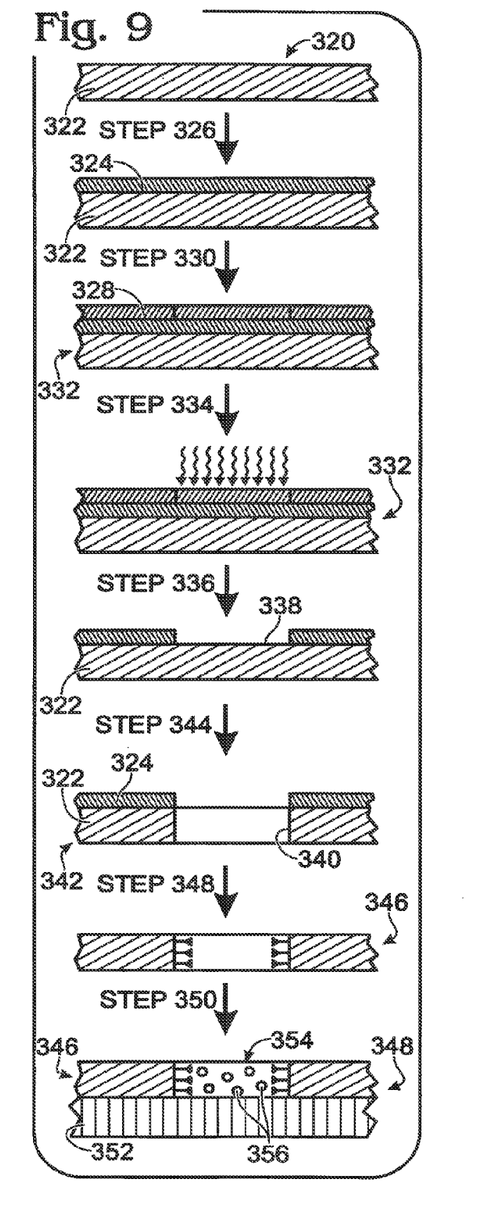
FIG. 9 is a series of view of structures produced during fabrication of a channel (well) array for assembly with the selectively addressable porous member produced in FIG. 8 to form an array-defining portion of a synthesis support device, in accordance with aspects of the present teachings.

This example describes exemplary methods of fabricating support devices for synthesis of oligomers in an array; see FIGS. 8 and 9.

FIG. 8 is a series of views of a porous member being processed according to a method 270 of forming a porous member having an array of hydrophilic islands and a hydrophobic spacer. Hydrophilic porous member 272 can be formed from a nonporous member by any suitable treatment, such as chemical etching of a silicon wafer, among others, or may be rendered porous by its fabrication (such as a fiber filter).

Step 274 can be performed by treatment of first porous member 272 with a modifying agent to create a hydrophobic porous member 276 from a more hydrophilic first porous member. In exemplary embodiments, step 274 can be performed by treatment of a silicon porous member with a fluorosilane or an alkane, among others. In some embodiments, step 274 can be performed selectively, such as with a mask, to create hydrophilic islands and a hydrophobic spacer.

Step 278 can be performed next to add a first mask layer 280 to hydrophobic porous member 276. The first mask layer can be patterned or not patterned, as shown in the present illustration. In some examples, step 278 can include forming a layer of a positive (or negative) photoresist on a surface of the hydrophobic porous member, such as by spin coating, among others.

Next, step 282 can place a second mask layer 284 on first mask layer 280 to create assembly 286. Second mask layer 284 can be a pre-patterned mask layer, such as a quartz chromium mask layer having optically transparent and opaque regions 288, 290, respectively.

Step 292 can be performed next by exposure of assembly 286 to light 294. Light is permitted to pass through transparent regions 288 and restricted from passage through opaque regions 290. Accordingly, first mask layer 280 can be selectively exposed to the light according to the arrangement of transparent regions 288.

The second mask layer then can be removed and the first mask layer processed to selectively remove regions exposed (or not exposed) to the light, shown at step 296, thereby creating uncovered regions 298.

Step 302 can be performed next to selectively modify uncovered regions 298 of hydrophobic porous member 276 to create a patterned porous member 304 having porous islands 306 and a hydrophobic spacer 308.

First mask layer 280 then can be removed, for example, by stripping photoresist from patterned porous member 304, shown at step 310. Porous member 304 then can be used for selective placement of reagents and/or to support oligomer synthesis in an array of reaction compartments.

Patterned porous member 304 can be fabricated by any suitable variations of method 270. For example, a pre-patterned mask layer, such as a quartz chromium mask, can be placed directly onto hydrophobic porous member 276, without use of a first mask layer. Next, hydrophobic porous member 276 can be selectively ablated adjacent transparent positions of the mask by exposure to light, such as ultraviolet light, to selectively increase the hydrophilicity of regions of the porous member.

FIG. 9 is a series of views of structures produced by a method 320 of fabricating a channel (permeable well) array. The channel array can be assembled with the patterned porous member produced by method 270 of FIG. 8 to create an array portion of a synthesis support device. The channel array can include a substrate 322, such as a silicon substrate, that is patterned by method 320.

A first mask layer 324 can be applied to substrate 322, shown at step 326. The first mask layer can be, for example, a positive or negative photoresist.

A pre-patterned mask layer 328 then can be placed on first mask layer, shown at step 330, to form a substrate assembly 332. The pre-patterned mask layer can, for example, define a predefined spatial pattern of permissive and restrictive light transmission, such as with a quartz chromium mask.

Substrate assembly 332 can be exposed to light, shown at step 334. The light can selectively photolyze regions of the first mask layer apposed to transparent regions of pre-patterned mask layer 328 (see method 270 of FIG. 8).

The pre-patterned mask layer 328 and photolyzed regions of the first mask layer then can be removed, shown at step 336.

Substrate 322 then can be exposed to an etchant configured to selectively remove the substrate at unprotected regions 338 to create channels 340 in a channel layer 342, shown at step 344. Any suitable etchant can be used including a chemical etchant (such as hydrofluoric acid), anodization (such as pulse anodization), and/or photoinduction, among others. Channels 340 can be through-holes of any suitable shape, include cylindrical, frustoconical, etc. Alternatively, channels 340 can be recesses having a porous floor.

First mask layer 324 then can be removed and channels 340 modified to create derivatized channel layer 346, shown at step 348. Channel modification can include reacting surfaces of the channels with a bis functional moiety (two or more reactive groups), for example, to coat the channel surfaces with a reactive moiety. Next, the reactive moiety on the channel surface can be connected to a photocleavable linker by chemical reaction. Alternatively, a photocleavable linker can be selected that is directly reactive with the channel surfaces without prior modification using the bis functional moiety. A suitable photocleavable linker can be stable during oligomer synthesis.

Channel layer 346 then can be further modified to create channel assembly 348, shown at step 350. In particular, a permeable retainer layer 352 can be apposed to the channel layer to create permeable wells 354. Optionally, particles 356 can be placed in the permeable wells and retained therein by retainer layer 352. Porous member 304 of method 270 (see FIG. 8) can be placed over channel assembly 348 to form a filtration device defining an array of selectively addressable reaction compartments.

Example 6

Further Aspects of the Present Teachings

This example suggests potential advantages of the synthesis platform of the present teachings over other platforms. These advantages can include one or more of the following.

(1) Scalability: the synthesis scale can be defined by the dimensions of the well (or channel), the area of the solid support(s) (e.g., particle surface area), and/or the concentration of reactive moieties on the solid support(s).

(2) The number of oligomers produced per synthesis run can be defined by the platform design (for example, the number of reaction compartments per synthesis support device).

(3) Cycle times can be directly related to the number of nozzles used to dispense amidites (or other oligomer reagents) and the speed and accuracy of dispensing.

(4) Reagent use can be minimized through surface tension localization.

(5) Substrates can be used as oligomer arrays where quality control can be performed using fluorescence-based strategies.

(6) Arrays can be used for genomics applications.

(7) The platform can be compatible with various oligomer chemistries, such as peptide nucleic acids, locked nucleic acids, peptides, small molecules, and/or the like.

(8) Oligomers can be synthesized with a low cost per oligomer.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed:

1. A method of placing reagents in reaction compartments of an array of reaction compartments comprising:
    dispensing a first reagent to one or more porous islands in an array of porous islands, wherein each porous island is in fluid communication with at least one reaction compartment disposed adjacent to said porous island, and wherein each porous island is configured to restrict said first reagent from flowing laterally beyond each of said one or more porous islands, wherein said porous island defines an upper layer of said reaction compartment, and wherein a retainer layer is disposed adjacent to said reaction compartment and said retainer layer defines a lower layer of said reaction compartment, wherein the reaction compartment is configured as a channel between said porous island and said retainer layer, wherein the channel walls comprise a reaction surface, and wherein said porous island is separable from said reaction compartment;
    dispensing a second reagent to said one or more porous islands; and
    removing said first and second reagents from said reaction compartment.

2. The method according to claim 1, further comprising:
    removing said first reagent from said reaction compartment before dispensing said second reagent.

3. The method according to claim 1, further comprising:
    dispensing said second reagent to said one or more porous islands before removing said first reagent from said reaction compartment.

4. The method of claim 1, wherein said second reagent is dispensed to contact concurrently a plurality of said porous islands.

5. The method of claim 1, wherein each porous island is surrounded by a spacer,
    wherein said each porous island and its surrounding spacer have different surface energies, and
    whereby said first reagent in a given porous island is restricted from flowing laterally over said surrounding spacer by said difference in surface energy.

6. The method of claim 1, wherein said first reagent is received in said each porous island,
    whereby said first reagent in a given porous island is restricted from flowing laterally between adjacent porous islands by capillary action between said first reagent and said porous island.

7. The method of claim 1, wherein said removing step is achieved by exerting a positive pressure to said reaction compartment to push fluid through said reaction compartment, thereby removing said first and second reagents from said reaction compartment.

8. The method of claim 1, wherein said removing step is achieved by exerting a negative pressure to said reaction compartment to pull fluid from said reaction compartment, thereby removing said first and second reagents from said reaction compartment.

9. The method of claim 1, wherein said retainer layer is a permeable retainer layer.

10. The method of claim 1, wherein said retainer layer is separable from said reaction compartment.

11. The method of claim 1, wherein said reaction surface comprises a reactive moiety covalently coupled to the channel wall.

12. A method of placing reagents in reaction compartments of an array of reaction compartments comprising:
    dispensing a first reagent to one or more porous islands in an array of porous islands, wherein each porous island is in fluid communication with at least one reaction compartment disposed adjacent to said porous island, and wherein each porous island is configured to restrict said first reagent from flowing laterally beyond each of said one or more porous islands, wherein said porous island defines an upper layer of said reaction compartment, and wherein a retainer layer is disposed adjacent to said reaction compartment and said retainer layer defines a lower layer of said reaction compartment, wherein the reaction compartment is configured as a channel between said porous island and said retainer layer, wherein the channel walls comprise a reaction surface, and wherein said retainer layer is separable from said reaction compartment;
    dispensing a second reagent to said one or more porous islands; and
    removing said first and second reagents from said reaction compartment.

13. The method according to claim 12, further comprising:
    removing said first reagent from said reaction compartment before dispensing said second reagent.

14. The method according to claim 12, further comprising:
    dispensing said second reagent to said one or more porous islands before removing said first reagent from said reaction compartment.

15. The method of claim 12, wherein said second reagent is dispensed to contact concurrently a plurality of said porous islands.

16. The method of claim 12, wherein each porous island is surrounded by a spacer, wherein said each porous island and its surrounding spacer have different surface energies, and whereby said first reagent in a given porous island is restricted from flowing laterally over said surrounding spacer by said difference in surface energy.

17. The method of claim 12, wherein said first reagent is received in said each porous island, whereby said first reagent in a given porous island is restricted from flowing laterally between adjacent porous islands by capillary action between said first reagent and said porous island.

18. The method of claim 12, wherein said removing step is achieved by exerting a positive pressure to said reaction compartment to push fluid through said reaction compartment, thereby removing said first and second reagents from said reaction compartment.

19. The method of claim 12, wherein said removing step is achieved by exerting a negative pressure to said reaction compartment to pull fluid from said reaction compartment, thereby removing said first and second reagents from said reaction compartment.

20. The method of claim 12, wherein said retainer layer is a permeable retainer layer.

21. The method of claim 20, wherein said porous island is separable from said reaction compartment.

\* \* \* \* \*